Dec. 25, 1951  R. H. LONG ET AL  2,580,108
TRANSMISSION OPERATING MECHANISM
Filed Sept. 21, 1946  8 Sheets-Sheet 3

Inventors
RICHARD H. LONG.
EARL R. PRICE.
H. O. Clayton
Attorney

Dec. 25, 1951  R. H. LONG ET AL  2,580,108
TRANSMISSION OPERATING MECHANISM
Filed Sept. 21, 1946  8 Sheets-Sheet 4

Inventors
RICHARD H. LONG.
EARL R. PRICE.
ATTORNEY

Dec. 25, 1951  R. H. LONG ET AL  2,580,108
TRANSMISSION OPERATING MECHANISM
Filed Sept. 21, 1946  8 Sheets-Sheet 5

Inventors
RICHARD H. LONG
EARL R. PRICE.
Attorney

Dec. 25, 1951  R. H. LONG ET AL  2,580,108
TRANSMISSION OPERATING MECHANISM
Filed Sept. 21, 1946  8 Sheets-Sheet 6

INVENTORS.
RICHARD H. LONG.
EARL R. PRICE.
BY H.O. Clayton
ATTORNEY.

INVENTORS
RICHARD H. LONG.
EARL R. PRICE.
BY H.O.Clayton
ATTORNEY.

Dec. 25, 1951  R. H. LONG ET AL  2,580,108
TRANSMISSION OPERATING MECHANISM
Filed Sept. 21, 1946  8 Sheets-Sheet 8

INVENTORS
RICHARD H. LONG.
EARL R. PRICE.
BY H.O.Clayton
ATTORNEY

Patented Dec. 25, 1951

2,580,108

UNITED STATES PATENT OFFICE 2,580,108

TRANSMISSION OPERATING MECHANISM

Richard H. Long and Earl R. Price, South Bend, Ind., assignors to Bendix Aviation Corporation, South Bend, Ind., a corporation of Delaware Application September 21, 1946, Serial No. 698,542

10 Claims. (Cl. 192—.073)

This invention relates in general to the power transmission mechanism of an automotive vehicle and in part to means for operating the change speed transmission and the friction clutch of said mechanism.

One of the objects of our invention is to provide, in an automotive vehicle including a fluid coupling and a three speeds forward and reverse transmission, a simple mechanism, power operated in part, for operating said transmission, all of the settings thereof being effected by a manual operation of said mechanism if the driver desires to so operate the mechanism, the second and high gear settings of the transmission, and the operation of the friction clutch to facilitate said settings, being effected by power means if the driver elects this operation of the mechanism.

A further object of our invention is to provide, in an automotive vehicle including a fluid coupling, a friction clutch and a three speeds forward and reverse transmission, means for operating and for facilitating the operation of said transmission, said means including power means, comprising a single acting motor, which is automatically operable, after the accelerator is released and at certain vehicle speeds, to establish the transmission either in its second gear setting or its high gear setting the friction clutch being operated by said motor to facilitate this operation of the transmission.

The principal object of our invention however is to improve upon the transmission and clutch operating mechanism disclosed in E. R. Price application No. 642,240, filed January 19, 1946, said mechanism embodying the features of the aforementioned objects of our invention, by combining with said mechanism means for effecting a stage clutch engaging operation of the motor of said mechanism and means for insuring the operation called for by the governor of said mechanism. It is therefore an object of our invention to improve upon the mechanism of said Price application by the inclusion therein of means for effecting what may be termed a re-cycle operation of the mechanism.

Other objects of the invention and desirable details of construction and combination of parts will become apparent from the following description of a preferred embodiment of our invention, which description is taken in conjunction with the accompanying drawings, in which:

Figure 1:
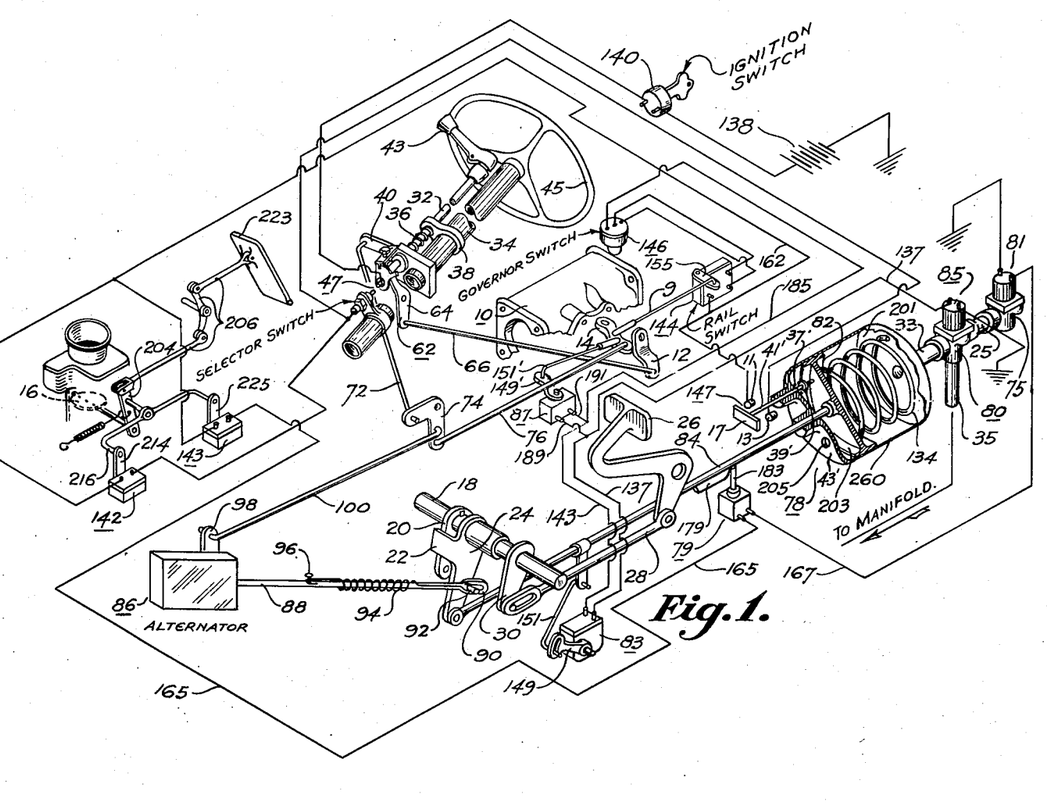
Figure 1 is a diagrammatic view of our invention disclosing the principal features thereof.

Referring now to Figure 1 disclosing a preferred embodiment of our invention, a three speeds forward and reverse transmission 10, preferably that used in one of the 1942 automotive vehicles, is operated by means of a manually operated crank 12 and a manually and power operated crank 14, the crank 12 serving to operate the shift rail selecting mechanism of the transmission and the crank 14 serving to operate that part of the transmission functioning to move the selector rail to establish the transmission in the desired gear ratio. With such a transmission the crank 14 must be moved to its transmission neutral position to neutralize the transmission before the shift rail selecting crank 12 may be operated.

Our invention resides in certain features of the hereinafter described manually and power operated means for actuating the aforementioned transmission operating cranks 12 and 14 and for operating the conventional friction clutch of the power plant said clutch including the usual driving and driven plates forced into engagement by clutch springs. The aforementioned transmission and clutch as well as the hereinafter referred to fluid coupling are of conventional design accordingly no claim is made thereto and the same are not disclosed in the drawings.

A feature of the mechanism of our invention lies in the combination of a fluid coupling, such e. g. as that which was incorporated in several 1941 and 1942 passenger vehicles, with the aforementioned mechanism which operates the transmission and friction clutch; and said coupling, which is preferably incorporated in the power plant between the engine and the friction clutch, includes, of course, an impeller and a vaned rotor, the latter serving to drive the aforementioned driving plate of the clutch.

The friction clutch is operably connected to a clutch throw out shaft 18 to which is keyed a crank member 20 contactable by a flange member 22 extending laterally from a crank member 24 rotatably mounted on the shaft 18. The conventional manually operated clutch pedal 26 of the car is operably connected, by a link 28, to a crank 30 which is drivably connected to the shaft 18. As is disclosed in Figure 1 the connection between the crank 30 and link 28 is of the lost motion type to obviate a movement of the clutch pedal when the clutch is power operated by the mechanism described hereinafter.

Figure 5:
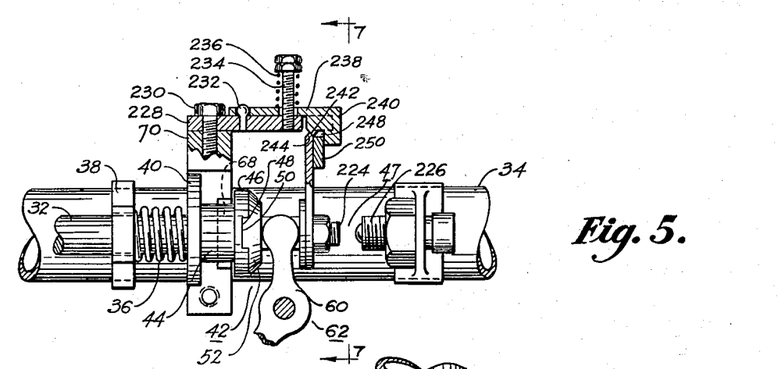
Figure 5 is an enlarged view of the mechanism at the base of the steering column said mechanism serving to disconnect the shift lever from the power operated transmission operation linkage.
Figure 6:
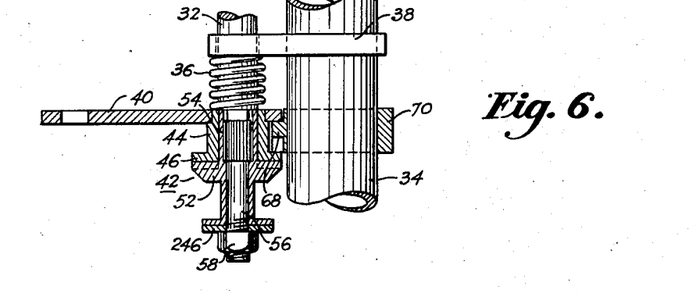
Figure 6 is a sectional view, taken on the line 6—6 of Figure 7, disclosing certain features of the mechanism disclosed in Figure 5.
Figure 7:
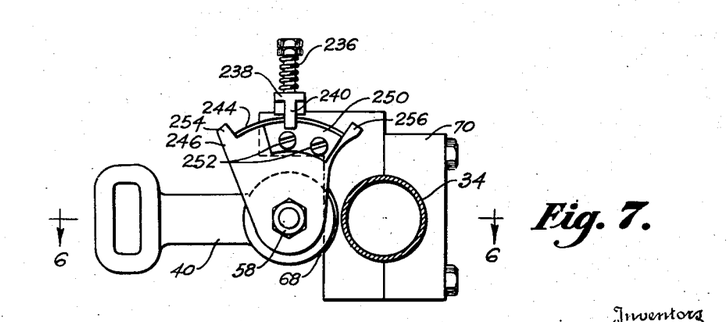
Figure 7 is a front view, taken on the line 7—7 of Figure 5, of the mechanism disclosed in Figure 5.

The shift rail operating cranks 12 and 14 are actuated by force transmitting means including a rotatable and bodily movable shaft 32 extending alongside the steering column 34 of the vehicle. As is disclosed in Figures 1, 5 and 6, the shaft 32 is biased downwardly by a spring 36 positioned between a stop 38 mounted on the steering column and a crank member 40 which is operably connected to said shaft by means of a clutch mechanism 42 described hereinafter. A shift lever 43 mounted beneath the steering wheel 45 is so connected to the shaft 32 that a rotation of said lever in a plane parallel to said wheel effects a rotation of said shaft about its longitudinal axis in the operation of either neutralizing the transmission or establishing the same in a gear setting; and this connection between the shift lever and shaft 32, which incidentally was used in one of the 1942 automatic vehicles, is also such that the cross-shift movement of the shift lever, that is the movement in a plane perpendicular to the plane of the steering column, results in a movement of the shaft 32 to either effect a shift rail selecting operation of the crank 12 or effect a declutching operation of the clutch 42 and a closing of a selector switch 47 to prepare the mechanism for its power operation.

Describing the aforementioned clutch mechanism 42, the said mechanism includes a member 44 sleeved over the lower end of the shaft 32, said member being permanently secured as by brazing to the crank 40. The lower end portion of the member 44 is provided with a flange 46 which is recessed at 48, Figure 5, to provide a keyway for a key portion 50' of a spool-shaped end portion of a clutch member 52, said member being sleeved over and drivably connected by splines 54 to the end portion 56 of the shaft 32. A nut 58, threaded on the end of the shaft portion 56, serves as a stop for the clutch mechanism which is biased downwardly by the operation of the spring 36.

The upper arm 60 of a bell-crank lever 62 fits within the spool-shaped portion of the clutch member 52 and the lower arm 64 of said lever is pivotally connected, by a link 66, to the shift rail selecting crank 12. As is disclosed in Figure 6, the spring 36 serves to bias the clutch 42 and shaft 32 as a unit downwardly, the movement being limited by a stop 68, Figure 6, constituting a part of a steering column mounted bracket member 70; and in this position of the clutch 42 the shift rail selector crank 12 is actuated to prepare the transmission for either a second gear or high gear operation, said operation of course depending upon the subsequent actuation of the shift rail operating crank 14. To actuate the crank 12 to prepare the transmission for either a low gear or reverse gear operation, that is a selection of the low and reverse gear shift rail of the transmission, the driver lifts the shift lever 43 upwardly in a plane perpendicular to the plane of the steering wheel; and this operation serves to rotate the bell-crank lever 62 in a counter-clockwise direction, Figure 5, the spring 36 being compressed and the flange 46, Figure 6, being moved into engagement with the stop 68. To actuate the shift rail operating crank 14 to neutralize the transmission or establish the same in any one of its four gear ratio settings, the driver rotates the shift lever 43 in a plane parallel to the plane of the steering wheel thereby effecting an angular movement of the crank 40 which is preferably connected to the crank 14 by force transmitting means including link 72, a bell-crank lever 74 and a link 76.

There is thus provided, by the above described mechanism, means for manually operating a three speeds forward and reverse transmission; and in this manual operation of the transmission the shift lever 43 is movable to five different positions, said selective movement outlining the letter H.

Figure 13:
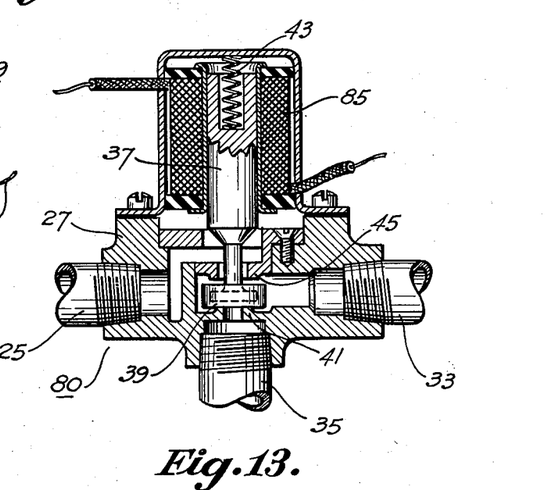
Figure 13 is a sectional view disclosing the details of the solenoid operated three way valve 80 of Figure 1.
Figure 14:
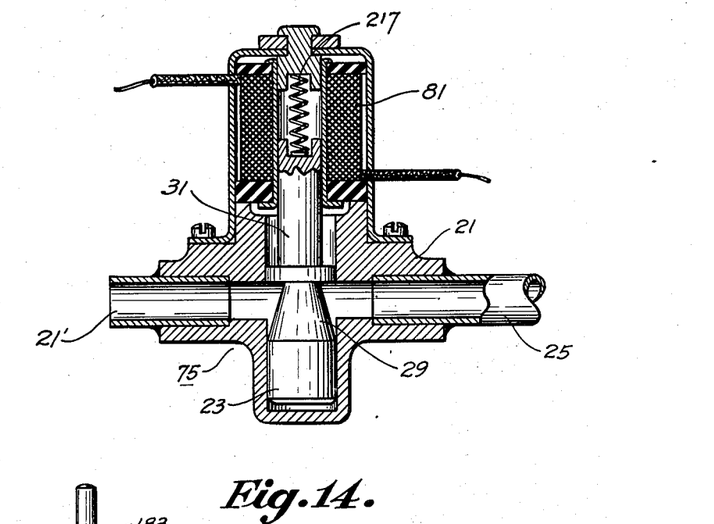
Figure 14 is a sectional view disclosing the details of the solenoid operated choke valve 75 for effecting a clutch engaging stage operation of the motor 78 of Figure 1.

Describing now the power means for operating the transmission and clutch, the principal element of this power means consists of a single-acting fluid pressure motor 78 operably connected to the clutch throw out shaft 18 and to the shift rail operating crank 14; and said motor is controlled by a solenoid operated three way valve 80 disclosed in detail in Figure 13 and by a solenoid operated choke valve 75 disclosed in detail in Figure 14. Describing the details of the valves 75 and 80, the former includes a casing 21 bored to receive a valve plunger member 23, a vent conduit 21' and one end of a conduit 25; and this conduit is connected at its other end to the casing 27 of the three way valve mechanism 80, Figure 13. The valve member 23 is shaped, in its central portion, to provide a cone portion 29 and the upper end of said member constitutes the armature 31 of a solenoid 81 operative to move the valve member 23 to its choke position.

Describing the three way valve 80 the casing 27 of said valve is bored to receive a conduit 33 connected to one end of the motor 78 and is also tapped to receive one end of a conduit 35 leading to the intake manifold of the internal combustion engine of the vehicle or other source of vacuum. To the lower end of the armature 37 of a valve operating solenoid 85 there is connected a valve member 39 which is adapted to be seated upon a seat 41 by the operation of a spring 43 and upon a seat 45 when the solenoid 85 is energized.

Describing now further details of the aforementioned power means, the power element 82 of the motor 78 is connected to the crank 24 by a rod 84; and said crank is yieldingly connected to an alternator unit 86 by means preferably including a pin 92 extending from the crank 24. One end of a spring 94, preferably coiled around the link 88, is connected to a pin 96 secured to said link; and the other end of said spring is fastened to the pin 92. A crank 98 of the alternator mechanism 86 is pivotally connected to the bell-crank lever 74 by a link 100.

Figure 4:
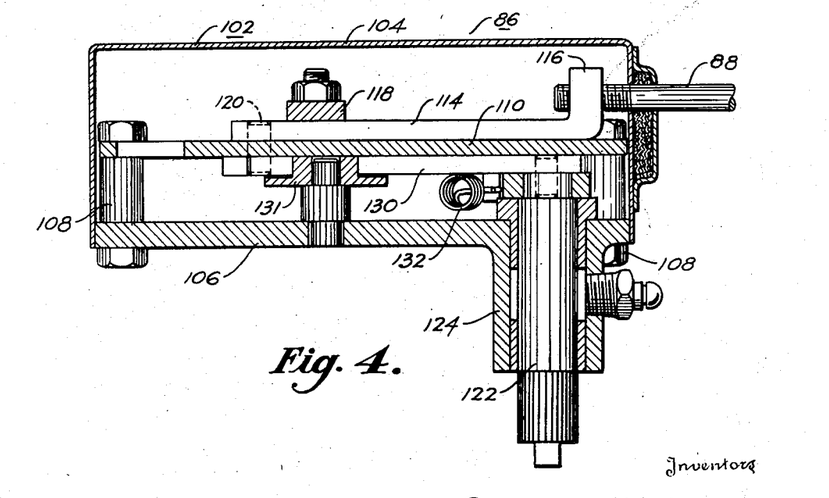
Figure 4 is a sectional view of the alternator unit said view being taken on the line 4—4 of Figure 3.

Describing now the details of the alternator 86, that is the direction changing mechanism of our invention, the same includes a casing 102, Figure 4, of two parts 104 and 106. To the casing part 106 there is detachably secured by bolts 108 a plate 110 having a V-shaped guide slot 112 therein, and a thrust member 114 adjustably secured at 116 to the link 88 and positioned between a strap 118 and the outer face of the plate 110 is provided with a laterally extending pin 120 which extends through the aforementioned V-shaped slot. To the outer end of a rotatable shaft 122 journalled in a boss 124 extending from the casing part 106 there is drivably connected the aforementioned crank 98, Figure 1; and to the inner end of the shaft 122 there is drivably connected a bell-crank lever 126. To one end of the latter lever there is pivotally connected a thrust link 128 which is recessed at its outer end to receive the pin 120; and to the other end of the lever 126 there is pivotally connected another thrust link 130 which is also recessed at its outer end to receive the pin 120; and the two thrust links are biased towards each other into contact with a guide roller 131 by a spring 132 connected to both of said links.

Figure 3:
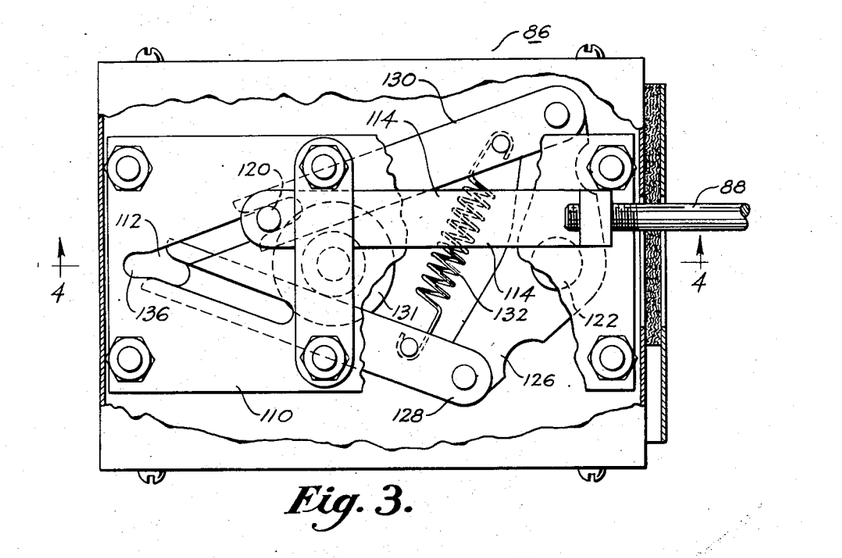
Figure 3 is a view disclosing details of the alternator unit of Figure 1.

Describing the operation of the above described alternator 86, when the fluid pressure motor 78 is de-energized a return spring 134 therein together with the clutch springs, serve to move the link 88 and thrust member 114 connected thereto to the left, Figure 3, to position the pin 120 within a recess 136 constituting the apex of the aforementioned V-shaped guide slot 112; then when the motor 78 is energized to effect an operation of the transmission and clutch the pin 120, after moving a relatively short distance, rests within the recessed end of one or the other of the thrust links 128 and 130, depending upon whether the transmission is at the time established in second gear or in high gear. Continued movement of the thrust member 114 then results in a rotation of the lever 126 to rotate the crank 98 to establish the transmission in its new setting; and as will be noted from an inspection of Figure 3 this operation of the lever 98 serves to move the then inoperative thrust member into position preparatory for its operation to rotate the lever 126.

There is thus provided an alternator or direction changing means whereby the transmission operating angular movement of the crank 14 is alternately reversed with each successive energization of the single-acting motor 78.

As to the means for controlling the operation of the motor 78, said means includes the electrical mechanism disclosed in Figures 1 and 2 and described in detail hereinafter; and this mechanism comprises a grounded battery 138, the ignition switch 140 of the car, the aforementioned switch lever operated selector switch 47, accelerator operated breaker switches 142 and 143 which are closed when the accelerator is released and opened when the accelerator is slightly depressed, motor operated switches 144 and 87, a vehicle speed responsive governor operated switch mechanism 146, a breaker switch 147 operated by the motor piston 82, switches 83 and 79 actuated by the piston operated rod 84, and the grounded solenoids 85 and 81 which operate the motor controlling three way valve 80 and choke valve 75 respectively. The switch mechanisms 142, 143, 144, 146, 87, 83 and 79 are conveniently mounted on parts of the power plant of the vehicle and are electrically interconnected as disclosed in Figures 1 and 2. The accelerator operated switches 142 and 143 are of a conventional breaker switch construction accordingly the same are not disclosed in detail. The accelerator 223 is preferably connected to the throttle valve 16 of the car by linkage 206 said linkage being connected to a crank 204; and the latter is connected, by a link 216, to cranks 214 and 225 which serve to actuate the switches 142 and 143.

Figure 16:
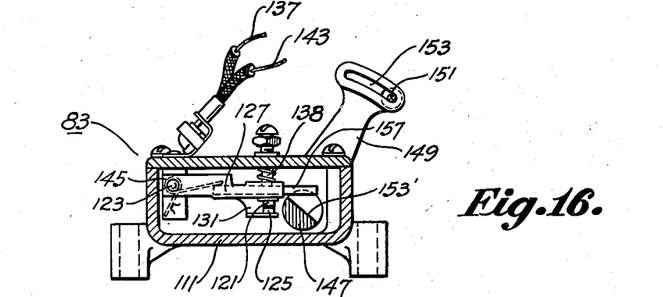
Figure 16 is a sectional view of the motor piston operated switch mechanism 83 of Figure 1 said mechanism serving in part to control the operation of the three way valve operating solenoid 85 of Figures 1 and 2.
Figure 17:
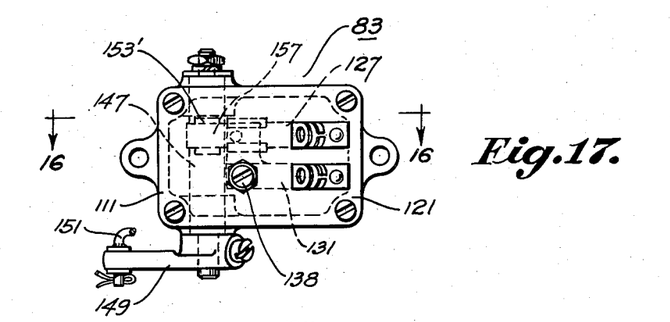
Figure 17 is a plan view disclosing details of the switch 83 of Figure 16.

Describing now the piston rod operated switch mechanism 83 this mechanism, which is disclosed in Figures 16 and 17, includes a two part casing 111 which houses a movable contact member 121 mounted upon a support member 127 of electrically conductive material said support being pivotally mounted at 123 upon said casing. The casing 111 also houses a fixed contact 125 mounted upon a support 131 of electrically conductive material said support also being secured to said casing; and the end of the support 131 is secured in place by a bolt 138 extending through the top of the casing. The support 131 is connected, by a wire 137 to the solenoid 85 and the support 127 is connected by a wire 143 to a wire 185 connected to the governor 146. The movable contact 121 is biased into abutment with the fixed contact 125 by a spring 145 acting upon the support 127 and to separate said contacts, that is open the switch mechanism 83, there is provided a cam shaft 147 journalled in the casing 111 and rotated by a crank 149 secured to one end of said shaft.

Figure 2:
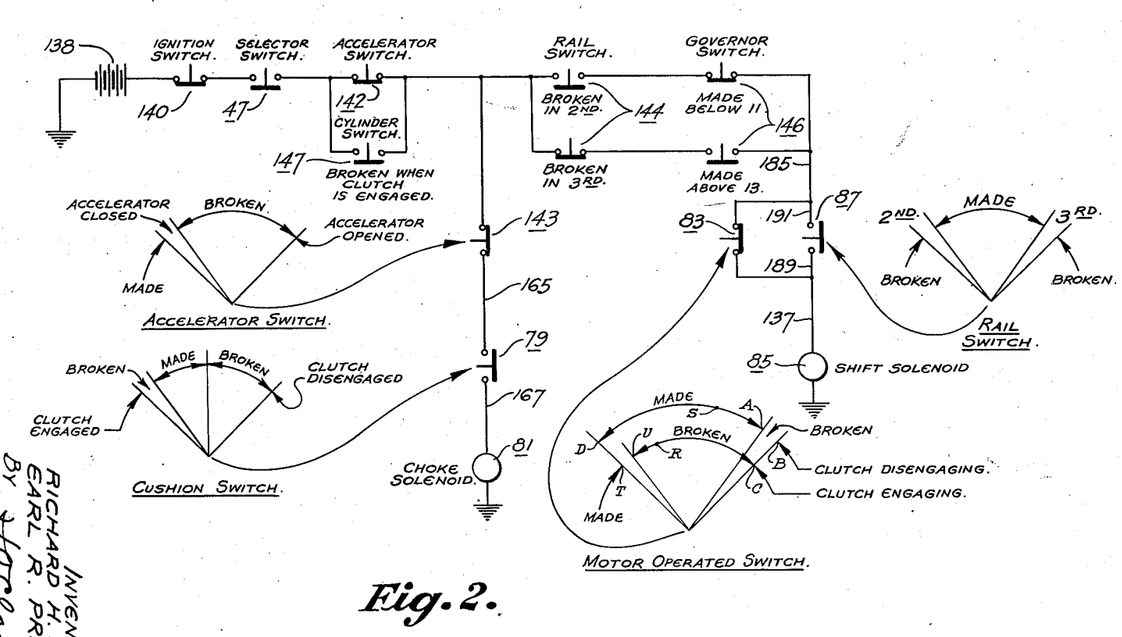
Figure 2 is a wiring diagram of the electrical mechanism disclosed in Figure 1.

Describing the operation of the switch 83, said operation being diagrammatically disclosed in Figure 2, when the motor piston 82 is in its clutch engaged position, that is the position disclosed in Figure 1, a link 151, secured to the piston rod 84, rests within the lower end of a slot 153 in the crank 149; all as is disclosed in Figure 1. At this time the switch contacts 121 and 125 are in abutment that is the switch 83 is closed. When the motor 78 is vacuum energized the piston 82 moves to the right, Figure 1, and during the first increment of this clutch disengaging movement of the piston the end of the link 151 is moved to the left; Figure 16, to take up the lost motion provided by the slot 153. This increment of movement of the piston is indicated by the letters DS in Figure 2; and it is to be noted that the switch 83 remains closed during this movement. Continued clutch disengaging movement of the piston 82 then results in a counter-clockwise rotation of the crank 149, Figure 16, and cam shaft 147 connected thereto; and this operation serves to take up the lost motion between the right end of a flat 153' on said shaft and the bottom of a member 157 of insulating material secured to the movable support member 127. This increment of movement of the piston 82 is indicated by the letters SA in Figure 2. Continued clutch disengaging and transmission operating movement of the piston 82 then serves to continue the counter-clockwise rotation of the cam shaft 147 to open the switch 83; and this increment of movement of the piston is indicated by the letters AB in Figure 2.

Describing the reverse operation of the switch 83, that is the operation when the spring 134 of the motor 78 moves the piston to the left, Figure 1, to engage the clutch and operate the alternator 86, the first increment of movement of said piston serves to move the link 151 to the right, Figure 16, to take up the lost motion provided by the slot 153; and this increment of movement is indicated by the letters CR in Figure 2; and the switch 83 of course remains open during this operation. Continued clutch engaging movement of the piston 82 serves to rotate the crank 149 clockwise, Figure 16, the switch 83 remaining open during this operation; and continued clockwise rotation of said crank, by the clutch engagement movement of said piston, serves to return the parts of the switch mechanism to the relative positions disclosed in Figure 16; and these last two increments of movement of the piston 82 are indicated by the letters RU and UT respectively.

Figure 15:
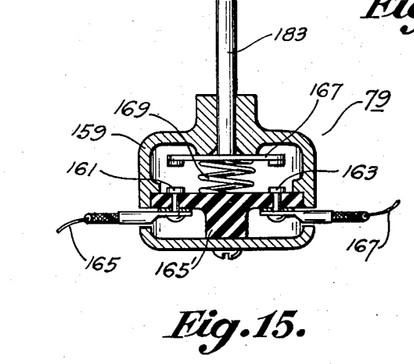
Figure 15 is a sectional view disclosing details of the motor piston operated switch 79 of Figure 1 said switch serving in part to control the operation of the choke valve operating solenoid 81 of Figure 14.

As to the motor operated breaker switch mechanism 79 this mechanism, which is disclosed in detail in Figure 15, includes a casing 159 housing fixed contact members 161 and 163 secured to a member 165' of insulating material, and also housing a movable contact 167 biased by spring 169 to its switch open position. The contacts 161 and 163 are electrically connected by a wire 165 and a wire 167 respectively, to the accelerator operated switch 143 and the choke valve operating solenoid 81. Describing the operation of the switch 79 a cam member 179, secured to the piston operated rod 84, serves to contact a switch operating pin 183 to hold the switch closed during a certain phase of the operation of the piston 82; and as to this phase of operation the parts of the mechanism are so constructed and arranged and so operative that the switch 79 is closed, during the clutch engaging operation of the motor 78, immediately prior to the contacting of the clutch plates one with another and remains closed until said piston is just short of its fully clutch engaged position. This operation of the switch 79 is diagrammatically disclosed in Figure 2 of the drawings. It is apparent, therefore, that during the clutch engaging operation of the motor 78, the accelerator at the time being closed to close the switch 143, the choke valve 75 is closed at the proper time to effect a stage operation of the motor 78. In this operation of the motor 78 the movement of the piston 82 is relatively slow as the clutch plates are being loaded; and said operation serves, during the down shift operation of the transmission, to prevent a sudden picking up of the engine which results in an excessive deceleration, that is forward surge of the car.

Figure 18:
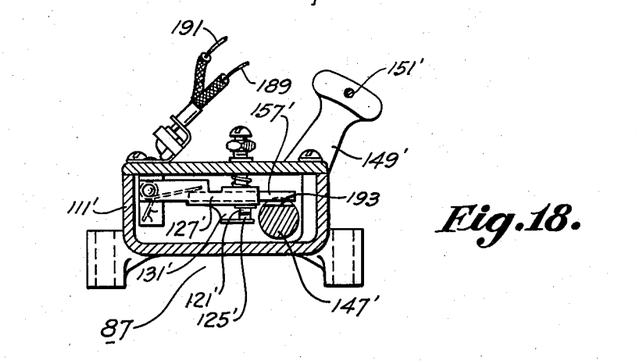
Figure 18 is a sectional view of the transmission operated cut out switch mechanism 87 of Figures 1 and 2.

As to the motor operated switch mechanism 87 disclosed in Figure 18 said mechanism, with the exception of the slot 153, duplicates the above described switch 83 accordingly the same is only briefly described. A casing 111' houses a fixed contact 121' and a movable contact 125' of said mechanism is biased into engagement with said fixed contact. The contacts 121' and 125' are mounted respectively upon support members 127' and 131'; and said members are electrically connected, by wires 189 and 191 respectively, to the aforementioned wires 137 and 185. A switch operating cam shaft 147' is journalled within the casing 111' and said shaft is rotated by a crank 149' secured to the shaft. The crank 149' is connected to the transmission operating crank 14 by a link 151'. Describing the operation of the switch mechanism 87, said operation being diagrammatically disclosed in Figure 2, the first and last increments of angular movement of crank 149', that is the movement of said crank as the gears of the transmission are being moved into mesh with each other, serve to open the switch 87. In this operation the outer edges of a flat portion 193 of the cam shaft 147' contact the bottom of a projection 157' extending from the movable support member 127'. It is apparent, therefore, that the switch 87 is open only when the transmission is established in gear, that is second gear or high gear. At all other times, that is as the crank 14 is being operated to change the setting of the transmission, the switch remains closed. The breaker switch 147 which is shown diagrammatically in Figure 1 preferably comprises fixed contacts 11 and 13 and a movable contact 17, said switch mechanism being mounted by any suitable support, not shown, adjacent the end of the motor 78; and as is disclosed in Figures 1 and 2, said switch is wired in parallel with the accelerator-operated switch 142. A switch operated rod 41' is secured to the movable contact 17.

Describing the operation of the switch 147, when the motor 78 is energized, resulting in a movement of the piston 82 to the right, Figure 1, a spring 37' interposed between the flanged end 39' of the rod 41' and the end wall 43' of the motor serves to move said rod to the right thereby closing said switch; and when the return spring 134 within the motor is operative to return the piston 82 to the position disclosed in Figure 1, that is the clutch-engaged position of the piston, the rod 41' is moved to the left by said piston to open the switch 147. There is thus provided an electrical circuit by-passing the parallel circuit controlled by the accelerator switch 142 and operative to maintain the electrical connection between the battery 138 and the solenoid 85 as the motor piston 82 is moving to the right and despite an opening of the switch 142. The purpose of the inclusion of the switch 147 will be set forth in greater detail hereinafter.

Figure 8:
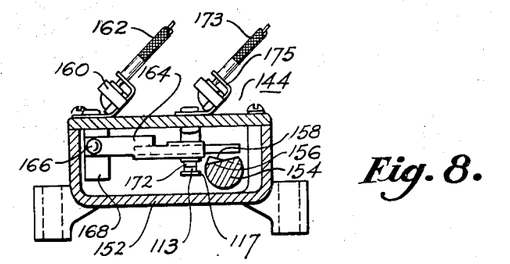
Figure 8 is a sectional view disclosing details of the transmission operating cut out switch of the invention, said view being taken on the line 8—8 of Figure 9.
Figure 9:
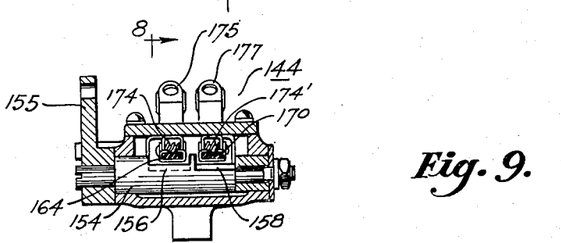
Figure 9 is a sectional view of the transmission operated cut out switch of our invention.
Figure 10:
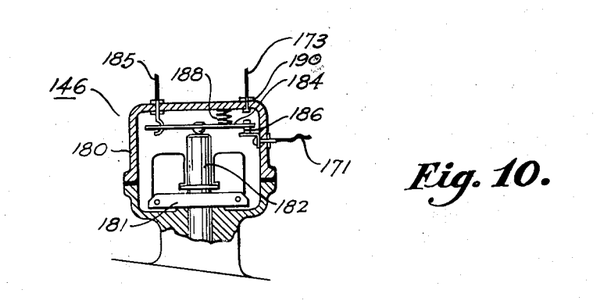
Figure 10 is a sectional view disclosing details of the governor operated switch of the invention.

As to the rail switch mechanism 144, which is disclosed in Figures 8 and 9 in its transmission neutral position, the same includes a two part casing 152 having journalled therein a switch operating cam shaft 154; and said shaft is provided with an inclined flat 156 and an oppositely inclined flat 158. A crank 155 is secured to the end of the shaft 154 and said crank is connected to the shift rail operating crank 14 by a link 9. A switch terminal 130 receives a hot wire 162, Figure 1, and to this terminal there is electrically connected a movable switch member 164 of electrical conductive material and which is pivotally connected at 166 to a post 168 secured to the inner face of the casing.

Figure 11:
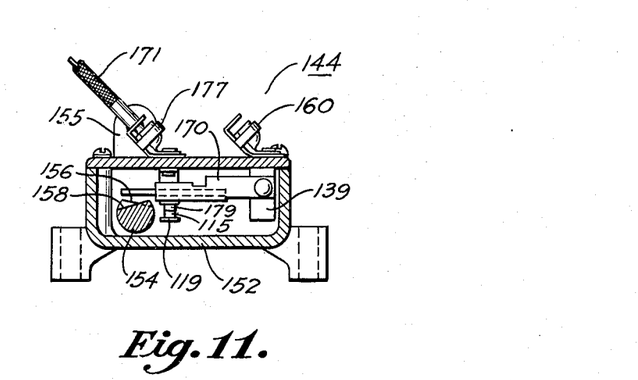
Figure 11 is a sectional view of the switch 144 similar to Figure 8, said view being taken on the line 11—11 of Figure 9.
Figure 12:
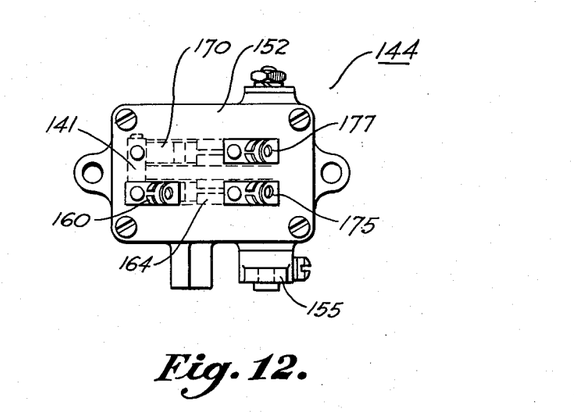
Figure 12 is a plan view disclosing details of the switch 144.

Another movable switch member 170, positioned alongside the switch member 164, is electrically connected, by a conductor 141, to the terminal 160. This switch member 170 is pivotally connected to a post 139 extending inwardly from the casing; and to said movable switch members there are secured switch contacts 172 and 179 disclosed respectively in Figures 8 and 11. Torsion springs 174 and 174' serve to bias the switch members 164 and 170 downwardly to move the aforementioned movable switch contacts 172 and 179 into engagement respectively with fixed switch contacts 113 and 115 which are mounted on supports 117 and 119 secured to the switch casing; and said contacts 113 and 115 are electrically connected, by said support members, to terminals 175 and 177, Figure 9, which are wired to the governor operated switch 146 by wires 173 and 171 respectively.

Describing the operation of the switch mechanism 144, when the transmission operating crank 14 is rotated clockwise, Figure 1, by the power means to establish the transmission in its second gear setting the switch operating crank 155 is also moved in a clockwise direction, Figure 1, and this operation serves to rotate the cam shaft 154, clockwise, Figure 8, to open the switch 115, 179, said opening being effected as the operation of the transmission is being completed; and the switch 113, 172 remains closed during this operation. The switch mechanism 144 of my invention is also so constructed, that is the cam faces 156 and 158 are so inclined and so spaced with respect to the closed switches 113, 172 and 115, 179, that a counter-clockwise rotation of the crank 155 to establish the transmission in its high gear setting will effect an opening of the switch 113, 172 when said setting is being completed. The switch 115, 179 remains closed during this operation. The aforementioned switches 113, 172 and 115, 179 are closed at all times except when the crank 155 is in one or the other of its extreme positions this being necessary to make possible the operation of the mechanism of our invention; for it is made clear from an examination of Figures 1 and 2 that once closed the electrical circuit for controlling the grounded solenoid 85 must be maintained closed until the vacuum operation of the motor 78 is completed.

Describing the governor operated switch mechanism 143, this mechanism includes a two part casing 180 housing a centrifugally operated governor mechanism 181 which is drivably connected to the propeller shaft of the vehicle or some other moving part of the power plant, the speed of which is directly proportional to the speed of the vehicle. A thrust member 182 of the centrifugal mechanism contacts the central portion of a movable switch contact member 184 which is biased into engagement with a fixed contact 186 by a spring 188. The parts of this switch mechanism are so constructed and arranged and so operative that when the vehicle is at a standstill or is travelling below a relatively low speed, for example 11 M. P. H., then the spring 188 serves to move the movable contact member 184 into engagement with the fixed contact 186; and when the vehicle is travelling above a certain speed, say 13 M. P. H., then the centrifugally operated mechanism 181 is operative to force the contact 184 into engagement with a fixed contact member 190. Completing the description of the switch mechanism 146 the other end of the movable contact member 184 is electrically connected to the wire 185 which is connected to the switches 83 and 87.

Now as will be noted from an inspection of Figure 2 and Figures 8 to 12 inclusive of the drawings the parts of the shift rail operated switch 144 are so operative and so cooperate with the governor operated switch 146 that an electrical circuit from the accelerator operated switch 142 to the switches 83 and 87 is completed when (1) the transmission is established in either second gear or high gear and (2) the governor is operated to close one or the other of the two switches operated thereby; for just as the second gear setting of the transmission is being completed one of the switches of the switch mechanism 144 is broken and the other switch of said switch mechanism is at the time made to thereby prepare for a high gear operation of the mechanism of our invention; then when the speed of the vehicle goes above 13 M. P. H. to close the switch 184, 190 the motor 78 is again energized to effect the high gear setting of the transmission. It is to be remembered, however, that the above discussed electrical circuits are completed to effect an energization of the motor 78 only when the accelerator is released to close the switch 142; and it is also to be remembered that the motor operated switch 147 is moved to its closed position immediately after the movement of the piston 82 is initiated to effect a disengagement of the clutch and an operation of the transmission. It is apparent therefore from an inspection of Figure 2 that the switch 147, wired as it is in parallel with the switch 142, provides an electrical means for insuring the completion of the clutch disengaging and transmission operating operation of the motor 78 despite an opening of the switch 142 during said operation. In other words the accelerator may be depressed, resulting in an opening of the switch 142, without cutting off the operation of the motor 78 to disengage the clutch and operate the transmission.

Describing now the complete operation of the above described mechanism it will be assumed that the car is at a standstill with the engine running and that the transmission is neutralized. The driver, to get the car under way, will then manually disengage the clutch by depressing the clutch pedal 26 and will then manually operate the shift lever 43 to establish the transmission in its low gear setting. The clutch will then be reengaged as the accelerator is depressed to get the car under way; and after the desired car speed is attained the transmission will be placed in its second gear setting.

Should the driver then wish to effect an automatic operation of the transmission he will move the shift lever to its automatic position, that is, the position to close the switch 47. The friction clutch is at the time engaged accordingly the piston 82 of the pressure differential operated motor 78 is in the position disclosed in Figure 1; and it is also to be remembered that at this time the transmission is established in its second gear setting, the switches 83, 87 and 113, 172 are closed and the alternator 86 is prepared for a high gear operation of the transmission.

The mechanism having been prepared for its automatic operation the driver will then increase the speed of the car above the aforementioned 13 M. P. H., that is above governor speed, and this operation results in an operation of the governor mechanism 146 to effect a closing of the switch 184, 190. The driver, to effect a high gear operation of the mechanism, will then release the accelerator to close the switches 142 and 143 whereupon the solenoid 85 is energized to open the three way valve 80; and this operation serves of course to effect a vacuum energization of the motor 78. Explaining this operation a control compartment 201 of the motor 78 is connected to the source of vacuum via the conduit 35 and the valve 80; and a compartment 203 of said motor is at the time vented to the atmosphere via an opening 205 in an end wall of the casing 260 of the motor. It follows therefore that the piston 82 is subjected to a differential of pressures to move the same to the right, Figure 1. Now the first increment of clutch disengaging movement of the piston 82 serves to close the switch 147 to insure a completion of the clutch disengaging and transmission operating operation of the motor, and to move the rod 84 to effect a separation of the clutch plates one from another, the spring 94 during the latter operation being elongated inasmuch as the rod 88 will not be moved to operate the transmission until after the clutch plates are separated, that is until after the driving torque is reversed. The next increment of movement of the piston 82 serves to increase the separation of the clutch plates that is complete the disengagement of the clutch and concurrently demesh the second speed gears of the transmission and move the driving gear or equivalent means of the transmission into abutment with the high speed gear to be meshed therewith; then after the high speed gears to be meshed are synchronized the spring 94 serves by its contracting action to bring said high speed gears into mesh to establish the transmission in its high speed setting. In effecting this operation the switches 83, 87 and 113, 172 are broken just as the high gear operation of the transmission is being completed.

Now the breaking of the electrical circuit to the solenoid 85 results in its de-energization whereupon the spring 43, Figure 13, functions to close the valve 80 the valve member 39 moving to the position disclosed in said figure; and this operation results in a venting of the motor compartment 201 to the atmosphere via the choke valve 75. The choke valve operating solenoid 81 is at the time de-energized accordingly the choke valve is positioned by the expansion of a spring 217, to permit a relatively rapid flow of air into the compartment 201.

The flow of air into the compartment 201 serves to de-energize the motor 78; the clutch springs, aided by the motor return spring 134, then operating to engage the clutch. The driven clutch plate then moves relatively quickly toward the driving clutch plate and when the driven plate has reached a position just short of engagement with the driving plate the cam 179 functions to close the switch 79 thereby effecting an energization of the choke valve operating solenoid 81; and this operation serves, by virtue of the upward movement of the full bodied portion of the valve member 23, Figure 14, to reduce the size of the opening interconnecting the conduits 25 and 21' and thereby reduce the rate of flow of air into the compartment 201. Accordingly there is effected a slowing down of the engagement of the clutch as the clutch plates move into driving contact with each other. As described above, this operation continues until just prior to completion of the clutch engaging movement of rod 84 whereupon the cam 179 moves to a position to permit an opening of the switch 79; and this operation serves to de-energize the solenoid 81 thereby effecting a resumed fast flow of air into the motor compartment 201 to complete the engagement of the clutch.

There is thus provided a stage, that is, fast, slow, fast, clutch engaging operation of the motor 78 to effect a smooth re-engagement of the clutch after the transmission has been established in high gear. In this clutch engaging operation of the motor 78 the alternator 86 is operated to prepare for a subsequent operation of the transmission to establish the same in its second gear setting; and the parts of the mechanism are so constructed and arranged and so operative that this operation of the alternator is completed prior to the closing of the switch 83 said closing being effected, as previously described during the final increment of movement of the piston 82.

The transmission having been established in high gear and the clutch re-engaged the driver will then again depress the accelerator to effect the desired speed of the car. Should the car be then slowed down below governor speed to effect a closing of the switch 184, 186, Figure 10, and the accelerator released to close the switches 142 and 143 then with one exception the above described cycle of operations will be repeated to again establish the transmission in its second gear setting; and this exception lies in the fact that the switch 115, 179 is broken instead of the switch 113, 172 just as the transmission is being established in its second gear setting. It is to be particularly noted here that after this second gear operation of the transmission is completed the fluid coupling of the power plant serves both to facilitate the above described clutch engaging operation of the motor 78 and to prevent the engine from stalling when the vehicle is brought to a standstill it being remembered that the friction clutch is at the time engaged. The above described stage clutch engaging operation of the motor 78, in effecting the above described second gear operation of the transmission, is particularly effective to prevent an undesired surge of the vehicle when the clutch is engaged during said operation.

Describing now the second of the two principal features of the mechanism of my invention, the first being the above described clutch control feature of the mechanism, there is provided, by the switch mechanisms 83 and 87, means for insuring the setting of the transmission which is called for by the governor operated switch 146, that is, the setting called for by the speed of the vehicle.

Describing the latter feature of our invention it will be assumed that during the operation of automatically shifting the transmission from second gear to high gear, and after said operation has progressed far enough to close the switch 115, 179, the driver inadvertently or by design applies the brakes of the car to suddenly slow the car speed down below governor speed. Now when this is done the governor switch 184, 190 is opened and the governor switch 184, 186 is closed the latter operation being effected before the shift to third gear is completed, that is before the switch 113, 172 is broken. Referring to Figure 2 of the drawings the flow of electricity to the solenoid 85 is then switched from the circuit including the switches 184, 190 and 113, 172 to the circuit including the switches 184, 186 and 115, 179 for it is to be remembered that the latter switch is at the time closed.

The operation of effecting the high gear setting of the transmission is then completed but it is to be remembered that the governor 146 is at the time calling for a second gear setting of the transmission; and it is also to be noted that with the omission of the switches 87 and 83 the solenoid 85 would not be de-energized upon the completion of the clutch disengaging and transmission operating movement of the piston 82. However, the inclusion of the above described switch 87 in the electrical circuit, Figure 2, and the breaking of said switch when high gear is established, results in a de-energization of the solenoid 85 and the resulting clutch engaging operation of the motor completes the cycle of operations of the mechanism. It is to be noted here that the inclusion of the spring 94, Figure 1, provides means whereby the piston 82 may bottom in the cylinder 260, that is complete the final increment of movement AB, Figure 2, prior to the breaking of the switch 83. It is accordingly necessary to include the switch 87 in the mechanism said switch serving to break the circuit to the solenoid 85 only when the high gear setting of the transmission is assured that is when the gears establishing this setting are actually moving into mesh. During the clutch engaging operation of the motor 78 the switch 83 remains broken until the last short increment of clutch engaging movement of the piston 82 thereby insuring the completion of the engagement of the clutch and the preselecting operation of the alternator 86.

Now when the clutch is re-engaged the switch 83 is automatically closed thereby completing an electrical circuit to the solenoid 85 via said switch and the then closed switches 184, 186 and 115, 179. Accordingly there is by this operation initiated what may be termed a re-cycle operation of the mechanism, the motor 78 being again energized and subsequently de-energized to successively effect a disengagement of the clutch, an operation of the transmission to effect its then called for second gear operation, and a re-engagement of said clutch.

Now the re-cycle operation just described is that whereby the transmission is eventually established in second gear after the transmission is temporarily established in high gear; and it is also to be noted, from an inspection of Figure 2 of the drawings, that if a high gear operation of the transmission is suddenly called for by the governor 146 during the operation of the mechanism in establishing the transmission in second gear both switches 113, 172 and 115, 179 then being made, that this high gear operation of the mechanism will be effected after the delay necessary to temporarily establish the transmission in second gear. The latter operations will be effected, for example, when the car is rolling to a stop below governor speed and the driver suddenly depresses the accelerator to speed up the vehicle.

There is thus provided, by the mechanism of our invention, electro-pneumatic power means comprising a single acting motor operable in one cycle of operations, for alternately effecting two different gear ratio settings of a change speed transmission and for operating a clutch to facilitate said operations of the transmission, said motor being controlled in part by a vehicle speed responsive governor operated switch mechanism and a transmission operated mechanism operative to automatically de-energize said motor as an operation of the transmission is being completed; and this power means is supplemented by switch mechanism operative to so control the operation of the power means that there is effected the setting of the transmission called for by the governor operated switch mechanism despite an operation of the power means to momentarily establish the transmission in the other of the aforementioned two settings. As stated above the mechanism of my invention constitutes an improvement upon the mechanism disclosed in the U. S. application for patent of E. R. Price No. 642,240, filed January 19, 1946.

Although this invention has been described in connection with certain specific embodiments, the principles are susceptible of numerous other applications that will readily occur to persons skilled in the art. The invention is, therefore, to be limited only as indicated by the scope of the appended claims.

Having thus described the various features of the invention, what we claim as new and desire to secure by Letters Patent is:

1. In an automotive vehicle provided with a power plant including a three speeds forward and reverse transmission, a friction clutch, an accelerator, a gear shift lever and a vehicle speed responsive governor; means for operating the clutch and transmission including power means for operating the clutch and operating the transmission to alternately establish the latter in its second and high gear settings, said power means including a single acting motor operative to successively disengage the clutch, operate the transmission and then re-engage the clutch in one cycle of operations, means, including yieldable means, interconnecting the power element of the motor, the transmission, and the clutch and operative to make possible a successive disengagement of the clutch and an operation of the transmission when the motor is energized, said connecting means further including an alternator mechanism operative to successively actuate the transmission to effect the second and high gear settings thereof, valve means for controlling the operation of said motor to successively effect its energization and de-energization, and means for operating and for controlling the operation of said valve means including a grounded solenoid operatively connected to the valve means, a grounded battery, an accelerator operated switch, a switch actuated by the gear shift lever, a single pole double throw switch mechanism actuated by the governor, a switch mechanism including two breaker switches biased by spring means to their closed position, means actuated by the motor for opening one of said breaker switches when the transmission is established in its second gear setting and for opening the other of said breaker switches when the transmission is established in its high gear setting, electrical conductor means interconnecting the two fixed contacts of said breaker switches with the two fixed contacts of the governor operated switch, and other electrical means serving to complete an electrical connection between the grounded battery and the grounded solenoid, said other electrical means including switch means, comprising a switch successively made and then broken by the operation of the motor as the power element thereof is moved to one of its extreme positions, incorporated in the electrical connection between the grounded solenoid and the aforementioned governor and transmission operated switch mechanisms and operative to automatically break the latter electrical connection when the transmission is established in either its second gear setting or its high gear setting and automatically operative to re-establish said latter electrical connection when the power element of the motor reaches its clutch engaged position.

2. In an automotive vehicle provided with a power plant including a three speeds forward and reverse transmission, a friction clutch, an accelerator, a gear shift lever and a vehicle speed responsive governor; means for operating the clutch and transmission including power means for operating the clutch and operating the transmission to alternately establish the latter in its second and high gear settings, said power means including a single acting motor operative to successively disengage the clutch, operate the transmission and then re-engage the clutch in one cycle of operations, means, including yieldable means, interconnecting the power element of the motor, the transmission, and the clutch, and operative to make possible a successive disengagement of the clutch and an operation of the transmission when the motor is energized, said connecting means further including an alternator mechanism operative to successively actuate the transmission to effect the second and high gear settings thereof; valve means for controlling the operation of said motor to successively effect its energization and de-energization, and means for operating and for controlling the operation of said valve means including a solenoid operatively connected to the valve means, a battery, an accelerator operated switch, a switch actuated by the gear shift lever, a single pole double throw switch mechanism actuated by the governor, a switch mechanism including two breaker switches biased by spring means to their closed position, means actuated by the motor for opening one of said breaker switches when the transmission is established in its second gear setting and for opening the other of said breaker switches when the transmission is established in its high gear setting, electrical conductor means interconnecting the two fixed contacts of said breaker switches with the two fixed contacts of the governor operated switch, and other electrical means serving to complete an electrical connection between the battery and the solenoid, said other electrical means including switch means, comprising a plurality of power operated switches, incorporated in the electrical connection between the solenoid and the aforementioned governor and motor operated switch mechanisms and operative to automatically break the latter electrical connection when the transmission is established in either its second gear setting or its high gear setting and automatically operative to re-establish said latter electrical connection when the power element of the motor reaches its clutch engaged position.

3. In an automotive vehicle provided with a power plant including a three speeds forward and reverse transmission comprising a transmission operating crank, a friction clutch, an accelerator, a gear shift lever and a vehicle speed responsive governor; means for operating the transmission and for operating the clutch to facilitate the operation of the transmission including a single acting pressure differential operated motor operably connected to the transmission and clutch by means including an alternator mechanism operative to alternately move said crank in opposite directions and also including means, comprising a yieldable member and operative when the motor is energized, for successively effecting a disengagement of the clutch and an operation of the alternator; valve means for controlling the operation of said motor, and electrical means for controlling the operation of said valve means to successively effect an energization and a de-energization of said motor to thereby successively effect a disengagement of the clutch, an operation of the transmission through the intermediary of the alternator, an operation of the alternator to prepare for a change of settings of the transmission and a re-engagement of the clutch the latter two operations being effected concurrently or substantially concurrently, said electrical means including a battery, a gear shift lever operated switch, an acelerator operated switch, a single pole double throw switch mechanism operated by the governor, two motor operated switches, the fixed contact of one of said latter switches being wired to one of the fixed contacts of the governor switch mechanism and the fixed contact of the other of said motor operated switches being wired to the other fixed contact of the governor switch mechanism, a valve operating solenoid, and switch means interconnecting said solenoid and the remainder of the electrical means and operative to break the electrical circuit to the solenoid when either the power element of the motor reaches its extreme operative that is clutch disengaged and transmission operated position, or the transmission is being operated to finally establish the same in either its second gear setting or its high gear setting.

4. In an automotive vehicle provided with a power plant including a three speeds forward and reverse transmission, a friction clutch, an accelerator, a clutch pedal, a gear shift lever and a vehicle speed responsive governor; manually and power operated means for operating the clutch and transmission, that portion thereof which serves to operate the transmission comprising two cranks extending from the casing of the transmission, one of said cranks serving to operate the mechanism within the transmission which selects one or the other of two shift rails of the transmission and the other of said cranks serving to operate the mechanism within the transmission which moves the selected rail to either neutralize the transmission or establish the same in any one of its four settings, force transmitting means interconnecting the gear shift lever with the two cranks, and power means, supplementing the operation of a part of the aforementioned force transmitting means and operative to effect a power operation of the clutch and an operation of the last mentioned crank to alternately establish the transmission in either its second gear setting or its high gear setting, said power means including a single acting motor operative to successively disengage the clutch, operate the transmission and then re-engage the clutch in one cycle of operations, means connecting the power element of the motor with the aforementioned part of the force transmitting means and with the clutch, said means including yieldable means operative to make possible a successive disengagement of the clutch and an operation of the transmission when the motor is energized and further including an alternator mechanism operative to successively actuate the latter crank in opposite directions to effect the second and high gear settings of the transmission; valve means for controlling the operation of said motor, and means, including interconnected electrical means, for operating and controlling the operation of said valve means including a solenoid, a battery, an accelerator operated switch, a switch operated by the selector lever, a single pole double throw switch mechanism actuated by the governor, a switch mechanism including two breaker switches biased by spring means to their closed position, means actuated by the motor for opening one of said breaker switches when the transmission is established in its second gear setting and for opening the other of said breaker switches when the transmission is established in its high gear setting, electrical conductor means interconnecting the two fixed contacts of said breaker switches with the two fixed contacts of the governor operated switch and other electrical means serving to complete an electrical connection between the battery and the solenoid, said other electrical means including switch means incorporated in the electrical connection between the solenoid and the governor and transmission operated switch mechanisms and operative to automatically break the latter electrical connection when the transmission is established in either its second gear setting or its high gear setting and automatically operative to re-establish said latter connection when the power element of the motor reaches its clutch engaged that is inactive position.

5. In an automotive vehicle provided with a power plant including a three speeds forward and reverse transmission, a friction clutch, an accelerator, a clutch pedal, a gear shift lever and a vehicle speed responsive governor; manually and power operated means for operating the clutch and transmission, that portion thereof which serves to operate the transmission comprising two cranks extending from the casing of the transmission, one of said cranks serving to operate the mechanism within the transmission which selects one or the other of two shift rails of the transmission and the other of said cranks serving to operate the mechanism within the transmission which moves the selected rail to either neutralize the transmission or establish the same in any one of its four settings, force transmitting means interconnecting the gear shift lever with the two cranks, and power means, supplementing the operation of a part of the aforementioned force transmitting means and operative to effect a power operation of the clutch and an operation of the last mentioned crank to alternately establish the transmission in either its second gear setting or its high gear setting, said power means including a single acting motor operative to successively disengage the clutch, operate the transmission and then re-engage the clutch in one cycle of operations, means connecting the power element of the motor with the aforementioned part of the force transmitting means and with the clutch, said means including yieldable means operative to make possible a successive disengagement of the clutch and an operation of the transmission when the motor is energized and further including an alternator mechanism operative to successively actuate the latter crank in opposite directions to effect the second and high gear settings of the transmission, valve means for controlling the operation of said motor, and means, including interconnected electrical means, for operating and controlling the operation of said valve means including a grounded solenoid, a grounded battery, an accelerator operated switch, a switch operated by the selector lever, a single pole double throw switch mechanism actuated by the governor, a switch mechanism including two breaker switches biased by spring means to their closed position, means actuated by the motor for opening one of said breaker switches when the transmission is established in its second gear setting and for opening the other of said breaker switches when the transmission is established in its high gear setting, electrical conductor means interconnecting the two fixed contacts of said breaker switches with the two fixed contacts of the governor operated switch and other electrical means serving to complete an electrical connection between the grounded battery and the grounded solenoid, said other electrical means including switch means, comprising two switch mechanisms operated by the power element of the motor, incorporated in the electrical connection between the grounded solenoid and the governor and motor operated switch mechanisms and operative to automatically break the latter electrical connection when the transmission is established in either its second gear setting or its high gear setting and automatically operative to re-establish said latter connection when the power element of the motor reaches its clutch engaged that is inactive position.

6. In an automotive vehicle provided with a power plant including a transmission operating gear shift lever, a vehicle speed responsive governor, a friction clutch, an accelerator, and a change speed transmission; power means for alternately effecting two settings of the transmission and for operating the clutch to facilitate said operation of the transmission, said power means comprising a single acting pressure differential operated motor, a valve for controlling the operation of said motor, means for controlling the operation of said valve to successively effect an energization and a de-energization of the motor, said means including a grounded solenoid, a grounded battery, an accelerator operated switch which is closed when the accelerator is released and opened when the accelerator is slightly depressed, a switch operated by the shift lever, a motor operated switch mechanism including two normally closed switches one of which is opened when the transmission is established in one of its settings and the other of which is opened when the transmission is established in another of its settings, electrical conductor means interconnecting in series with each other, the battery, the accelerator operated switch, the shift lever operated switch and the movable contacts of the two motor operated switches, a single pole double throw switch operated by the governor, electrical conductor means interconnecting the fixed contacts of the governor operated switch with the fixed contacts of the two motor operated switches, and electrical means for interconnecting the movable contact of the governor operated switch with the grounded solenoid including switch means operated by the power element of the motor and operative to break the electrical connection between the governor operated switch and the solenoid when the power element reaches one of its extreme positions in the cylinder of the motor and also operative to remake said electrical connection when said power element is positioned in the other of its extreme positions in the motor cylinder.

7. In an automotive vehicle provided with a power plant including a transmission operating gear shift lever, a vehicle speed responsive governor, a friction clutch, an accelerator, and a change speed transmission; power means for alternately effecting two settings of the transmission and for operating the clutch to facilitate said operation of the transmission, said power means comprising a single acting pressure differential operated motor, a valve for controlling the operation of said motor, means for controlling the operation of said valve to successively effect an energization and a de-energization of the motor, said means including a grounded solenoid, a grounded battery, an accelerator operated switch which is closed when the accelerator is released and opened when the accelerator is slightly depressed, a switch operated by the shift lever, a motor operated switch mechanism including two normally closed switches one of which is opened when the transmission is established in one of its settings and the other of which is opened when the transmission is established in another of its settings, electrical conductor means interconnecting in series with each other, the battery, the accelerator operated switch, the shift lever operated switch and the moveable contacts of the two motor operated switches, a single pole double throw switch operated by the governor, electrical conductor means interconnecting the fixed contacts of the governor operated switch with the fixed contacts of the two motor operated switches, and electrical means for interconnecting the movable contact of the governor operated switch with the grounded solenoid including switch means operated by the power element of the motor and operative to break the electrical connection between the governor operated switch and the solenoid when the power element reaches one of its extreme positions in the cylinder of the motor and also operative to remake said electrical connection when said power element is positioned in the other of its extreme positions in the motor cylinder together with a switch, including a fixed contact, a movable contact and a motor operated member for moving the movable contact, electrically connected in parallel with the aforementioned power element operated switch in the electrical circuit interconnecting the grounded solenoid and the movable contact of the governor operated switch, said latter motor operated switch serving to break the latter electrical circuit when the transmission is established in either one of the aforementioned two settings.

8. In an automotive vehicle provided with a power plant comprising a change speed transmission, a friction clutch, an accelerator, and a vehicle speed responsive governor; means for operating the transmission and clutch including power means operative, when the accelerator is released and the vehicle is traveling at a certain speed, to initiate, in succession, a disengagement of the clutch, an operation of the transmission and a reengagement of the clutch, said power means including a single acting pressure differential operated motor, means, including an alternator mechanism and a spring, interconnecting the power element of the motor with the transmission and means interconnecting said latter means with the clutch, said spring serving to make possible, when the motor is energized, a disengagement of the clutch prior to an operation of the transmission and said alternator mechanism serving to make possible successive operations of the transmission to establish the same first in one setting and then in another setting, valve means for controlling the operation of said motor, and means for controlling the operation of said valve means comprising a battery, a solenoid, an accelerator operated switch, a switch mechanism operated by the governor, switch means, including two separate switches, operated by the motor, electrical conductor means interconnecting the aforementioned switches and battery, and switch means incorporated in electrical means interconnecting the solenoid and the motor and governor operated switch mechanisms and operative to insure a breaking of the electrical circuit interconnecting the grounded battery and solenoid when the motor has completed its power operation and to insure the remaking of said circuit when the power element of the motor is returned to its motor de-energized position.

9. In an automotive vehicle provided with a power plant including a vehicle speed responsive governor, a friction clutch, an accelerator, and a change speed transmission; power means for alternately effecting two settings of the transmission and for operating the clutch to facilitate said operation of the transmission, said power means comprising a single acting pressure differential motor, valve means for controlling the operation of said motor, means for controlling the operation of said valve means to successively effect an energization and a deenergization of the motor, said valve control means including a plurality of electrical controls comprising a valve operating solenoid, a battery, an accelerator operated switch which is closed when the accelerator is released and opened when the accelerator is slightly depressed, a manually operated switch, a motor operated switch mechanism including two normally closed switches, one of which is opened when the transmission is established in one of its settings and the other of which is opened when the transmission is established in another of its settings, electrical conductor means interconnecting in series with each other, the battery, the accelerator operated switch, the manually operated switch, and the movable contacts of the two motor operated switches, a single pole double throw switch operated by the governor, electrical conductor means interconnecting the fixed contacts of the governor operated switch with the fixed contacts of the two motor operated switches, and electrical means interconnecting the movable contact of the governor operated switch with one of the electrical controls including switch means operated by the power element of the motor and operative to break the electrical connection between the governor operated switch and the latter electrical control when the power element reaches one of its extreme positions in the cylinder of the motor and also operative to remake said electrical connection when said power element is positioned in the other of its extreme positions in the motor cylinder.

10. In an automotive vehicle provided with a power plant including a vehicle speed responsive governor, a friction clutch, an accelerator, and a change speed transmission; power means for alternately effecting two settings of the transmission and for operating the clutch to facilitate said operation of the transmission, said power means comprising a single acting pressure differential motor, valve means for controlling operation of said motor, means for controlling the operation of said valve means to successively effect an energization and a de-energization of the motor said valve controlling means including a plurality of electrical controls comprising a valve operating solenoid, a battery, an accelerator operated switch which is closed when the accelerator is released and opened when the accelerator is slightly depressed, a manually operated switch, a motor operated switch mechanism including two normally closed switches one of which is opened when the transmission is established in one of its settings and the other of which is opened when the transmission is established in another of its settings, electrical conductor means interconnecting in series with each other, the battery, the accelerator operated switch, the manually operated switch, and the movable contacts of the two motor operated switches, a single pole double throw switch operated by the governor, electrical conductor means interconnecting the fixed contacts of governor operated switch with the fixed contacts of the two motor operated switches, and electrical means interconnecting the movable contact of the governor operated switch with one of the electrical controls including switch means operated by the power element of the motor and operative to break the electrical connection between the governor operated switch and the latter electrical control when the power element reaches one of its extreme positions in the cylinder of the motor and also operative to remake said electrical connection when said power element is positioned in the other of its extreme positions in the motor cylinder together with the a switch, including a fixed contact, a movable contact and a motor operated member for moving the movable contact, electrically connected in parallel with the aforementioned power element operated switch in the electrical circuit interconnecting the latter electrical control and the movable contact of the governor operated switch, said latter motor operated switch serving to break the latter electrical circuit when the transmission is established in either one of the aforementioned two settings.

RICHARD H. LONG.
EARL R. PRICE.

REFERENCES CITED

The following references are of record in the file of this patent:

UNITED STATES PATENTS

| Number | Name | Date |
|---|---|---|
| 1,911,599 | Bloxsom | May 30, 1933 |
| 2,092,446 | Fleischel | Sept. 7, 1937 |
| 2,098,691 | Neff | Nov. 9, 1937 |
| 2,109,443 | Hill et al. | Feb. 22, 1938 |
| 2,351,067 | Randol | June 13, 1944 |